(12) United States Patent
Doerry

(10) Patent No.: US 10,473,755 B1
(45) Date of Patent: Nov. 12, 2019

(54) WAVEFORM WARPING FOR GENERAL FREQUENCY-MODULATED RADAR WAVEFORMS

(71) Applicant: National Technology & Engineering Solutions of Sandia, LLC, Albuquerque, NM (US)

(72) Inventor: Armin W. Doerry, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 395 days.

(21) Appl. No.: 15/438,024

(22) Filed: Feb. 21, 2017

(51) Int. Cl.
*G01S 7/28* (2006.01)
*G01S 13/93* (2006.01)

(52) U.S. Cl.
CPC ............ *G01S 7/2813* (2013.01); *G01S 13/93* (2013.01)

(58) Field of Classification Search
CPC ..................................................... G01S 13/931
See application file for complete search history.

(56) References Cited

U.S. PATENT DOCUMENTS

| | | | | |
|---|---|---|---|---|
| 5,652,589 A | * | 7/1997 | Ono | G01S 13/345 342/70 |
| 5,694,130 A | * | 12/1997 | Suzuki | G01S 13/34 342/70 |
| 6,067,038 A | * | 5/2000 | Uehara | G01S 13/34 342/109 |
| 6,522,287 B1 | * | 2/2003 | Stopczynski | B60R 21/013 180/271 |
| 6,798,373 B2 | * | 9/2004 | Kishida | G01S 7/4008 342/109 |

(Continued)

FOREIGN PATENT DOCUMENTS

JP   08189965 A * 7/1996 ............ G01S 13/34

OTHER PUBLICATIONS

Doerry, Armin, "Bandwidth Requirements for Fine Resolution Squinted SAR", In Proceedings of SPIE, vol. 4033, 2000, 11 pages.

(Continued)

*Primary Examiner* — Peter M Bythrow
(74) *Attorney, Agent, or Firm* — Medley, Behrens & Lewis, LLC

(57) ABSTRACT

Various technologies pertaining to motion compensation for radar systems using FM waveforms are described herein. A waveform generator outputs a parametrized, pulsed FM waveform to a radar antenna, whereupon the radar antenna emits pulsed electromagnetic (EM) radiation into a target area based upon the parametrized FM waveform. The parametrized FM waveform compensates for motion of a radar platform that includes the antenna. The parametrized FM waveform compensates for inter-pulse Doppler effects by introducing a time delay to a reference FM waveform, and compensates for intra-pulse Doppler effects by time dilating, or frequency-scaling, pulses of the reference waveform. The parametrized FM waveform can be generated by modifying the reference waveform based on first and second parameters, where the parameters are based upon motion of the radar platform and changes in echo return delay times from one pulse to another.

20 Claims, 6 Drawing Sheets

(56) References Cited

U.S. PATENT DOCUMENTS

| | | | | |
|---|---|---|---|---|
| 6,888,494 B2* | 5/2005 | Tamatsu | ................ | G01S 13/345 342/109 |
| 7,400,290 B2* | 7/2008 | Woodington | ........... | G01S 7/414 342/107 |
| 7,804,444 B2* | 9/2010 | Yamashina | ............. | G01S 7/282 342/70 |
| 8,169,359 B2* | 5/2012 | Aoyagi | .................. | G01S 13/18 342/104 |
| 2004/0027305 A1* | 2/2004 | Pleva | ...................... | G01S 7/032 343/853 |
| 2004/0164892 A1* | 8/2004 | Shinoda | ............. | G01S 13/4463 342/107 |
| 2006/0012511 A1* | 1/2006 | Dooi | ........................ | G01S 7/02 342/70 |
| 2006/0012513 A1* | 1/2006 | Walton | .................... | G01S 7/023 342/195 |
| 2007/0152870 A1* | 7/2007 | Woodington | ........... | G01S 7/414 342/70 |
| 2010/0277359 A1* | 11/2010 | Ando | ....................... | G01S 7/03 342/70 |
| 2010/0277361 A1* | 11/2010 | Focke | ................... | G01S 13/345 342/133 |
| 2016/0116570 A1* | 4/2016 | Ramasubramanian | ... | G01S 7/02 342/118 |
| 2016/0131742 A1* | 5/2016 | Schoor | ................. | H01Q 1/3233 342/128 |
| 2018/0045819 A1* | 2/2018 | Cornic | .................... | G01S 13/28 |
| 2018/0284265 A1* | 10/2018 | Bilik | ..................... | B60W 30/08 |

OTHER PUBLICATIONS

Doerry, A.W., "Generating Precision Nonlinear FM Chirp Waveforms", In SPIE 2007 Defense and Security, vol. 6547, 2007, pp. 1-12.

Doerry, et al., "Digital Synthesis of Linear-FM Chirp Waveforms—Comments on Performance and Enhancements", In SPIE 2014 Defense and Security Symposium, vol. 9077, 2014, pp. 1-12.

Doerry, Armin W., "Generating Nonlinear FM Chirp Waveforms for Radar", Sandia Report No. SAND2006-5856, Sep. 2006, 34 pages.

Doerry, Armin W., "SAR Processing with Non-Linear FM Chirp Waveforms", Sandia Report No. SAND2006-7729, Dec. 2006, 66 pages.

Wang, et al., "First Demonstration of Airborne SAR with Nonlinear FM Chirp Waveforms", In IEEE Geoscience and Remote Sensing Letters, vol. 13, No. 2, Feb. 2016, pp. 247-251.

* cited by examiner

WAVEFORM WARPING FOR GENERAL FREQUENCY-MODULATED RADAR WAVEFORMS

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Intelligence, surveillance, and reconnaissance (ISR) radar systems are used in a variety of remote sensing activities to identify information about objects in a target area. These systems include such systems as synthetic aperture radar (SAR), ground moving target indicator (GMTI) radar, dismount moving target indicator (DMTI) radar, wide area search (WAS) radar, and inverse SAR (ISAR). These radar systems, particularly those carried by airborne platforms, are often in motion during interrogation of their target areas. Data processing ex post for radar data collected by such systems can be simplified by dynamic waveform parameter manipulation that compensates for radar motion during a data collection interval. Frequency-modulated waveforms are commonly used as output waveforms for radar antennae in pulsed radar systems. Conventional systems often use linear FM chirp waveforms that are readily generated and manipulated by programmable digital parametric waveform generators to effect radar motion compensation. A linear FM chirp is modulated with a continuous, constant rate of frequency change within each radar pulse. Other FM waveforms may be used, but modification of a general FM waveform to compensate for motion of the radar antenna can require complex calculations, which may be prohibitive to calculating a new, motion-compensated waveform for each radar pulse.

SUMMARY

The following is a brief summary of subject matter that is described in greater detail herein. This summary is not intended to be limiting as to the scope of the claims.

Various technologies pertaining to motion compensation for radar systems using FM waveforms are described herein. A waveform generator outputs a parametrized FM waveform to a radar antenna, whereupon the radar antenna emits electromagnetic (EM) radiation into a target area based upon the parametrized FM waveform. The parametrized FM waveform can be substantially any FM signal, for example a non-linear FM chirp. The waveform generator is configured to output the parametrized FM waveform to compensate for motion of a radar platform that includes the waveform generator and the antenna. The parametrized FM waveform compensates for inter-pulse Doppler effects by introducing a time delay to a reference FM waveform, and compensates for intra-pulse Doppler effects by time-dilating, or frequency-scaling, pulses of the reference waveform. The parametrized FM waveform can be generated by modifying the reference waveform based on first and second parameters. The first parameter can be a parameter that is based upon a velocity of the platform with respect to a scene reference point. The second parameter can be a parameter that is based upon the velocity of the platform with respect to the scene reference point and a difference between a first time delay between transmission of a first pulse and receipt of a first echo return and a second time delay between transmission of a second pulse and receipt of a second echo return.

By modifying the reference waveform based upon the first and second parameters, a waveform generator can generate a general FM waveform, including non-linear FM chirp waveforms, sufficiently quickly so that each pulse of a pulsed radar is independently compensated for motion of the radar platform. Once generated, the parametrized FM waveform is output to a radar antenna, which emits a radar signal into a target region based upon the parametrized FM waveform. Since the parametrized FM waveform compensates for motion of the radar platform, processing of echo returns of the radar signal to yield useful data (e.g. SAR images) is simplified as compared to an uncompensated waveform.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
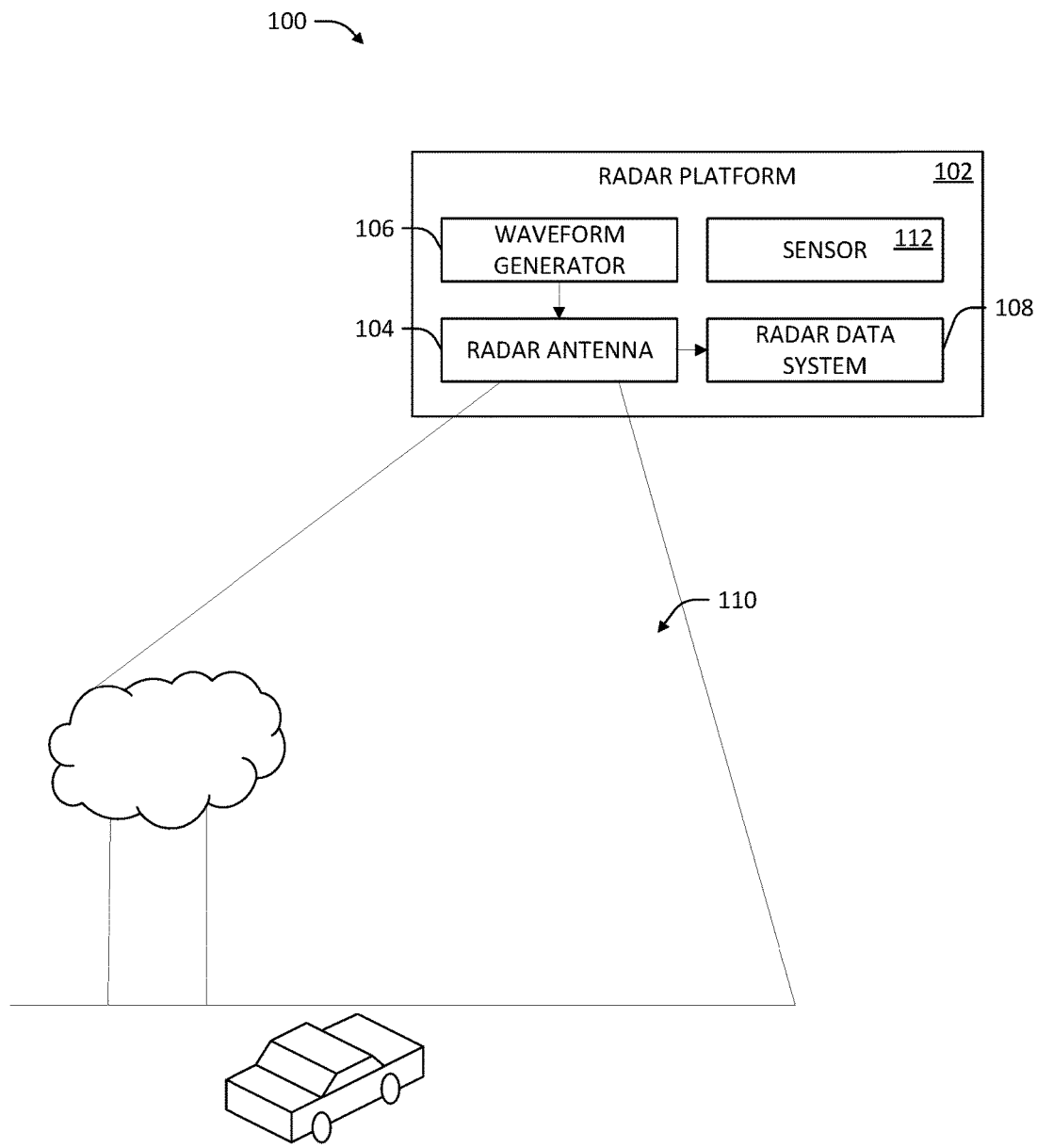
FIG. 1 is a functional block diagram of an exemplary system that facilitates motion compensation for radar systems using general FM output waveforms.

Various technologies pertaining to parametric frequency-modulated radar waveform generation are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary system 100 that facilitates generation of parametric FM radar waveforms is illustrated. The system 100 includes a radar platform 102 (e.g., an aircraft or other vehicle, or a stationary radar platform) that includes a radar antenna 104, a waveform generator 106, and a radar data system 108. The waveform generator 106 generates a waveform signal that is output by the radar antenna 104. The radar antenna 104 emits electromagnetic (EM) radiation into a target area 110 based upon the waveform signal generated by the waveform generator 106. The emitted EM radiation is reflected and/or scattered by various objects in the target area 110, and some portion of the EM radiation is received at the antenna 104 as an echo return signal. The radar data system 108 can receive the echo return signals from the antenna 104 and can store data indicative of the echo return signals. The radar data system 108 can further be configured to generate imagery or other analysis data, wherein the imagery or analysis data can be suitable for use in connection with various applications such as surveillance of the target area 110, detection of objects or vehicles in the target area 110, mapping of the target area 110, etc.

The waveform generator 106 can generate a pulsed waveform such that the system 100 operates as a pulsed radar system. The waveform generator 106 outputs a plurality of N pulses to the antenna 104, whereupon the antenna 104 outputs a pulsed radar signal. In an example wherein the system 100 is a SAR system, the N pulses comprise the synthetic aperture. In another example wherein the system 100 is a GMTI/DMTI/WAS system, the N pulses can comprise a coherent processing interval (CPI).

The waveform generator 106 is configured to output FM waveforms that are modulated with non-linear frequency functions and that are compensated for motion of the radar platform 102 during a data collection interval of the system 100. The waveform generator 106 generates an FM waveform. In an example, the waveform can be a frequency signal indicative of a frequency of a function $x._{T}(t)$ desirably transmitted by the radar antenna 104. The waveform generator 106 then modifies the FM waveform based upon parameters associated with the motion of the radar platform 102. For example, the waveform generator 106 can scale a frequency of the FM waveform to account for intra-pulse time dilation of a signal transmitted by the radar antenna 104. Intra-pulse time dilation refers to a Doppler-shift of a received echo pulse relative to a transmitted pulse, wherein the frequency shift is caused by motion of the radar platform 102 relative to a target in the target area 110. A frequency scaling parameter to account for intra-pulse time dilation can be based upon a velocity of the radar platform 102 relative to a known reference point in the target area 110 of the antenna 104. In another example, the waveform generator 106 can time-delay one or more pulses of the FM waveform to account for inter-pulse Doppler effects. Inter-pulse Doppler effects refer to a change in echo return time from one pulse to another due to motion of the radar platform 102 relative to the target. A time delay parameter can be based upon a velocity of the radar platform 102 relative to a known reference point in the target area 110 and a difference in echo delay time from one pulse to another relative to a same reference. Parameters used by the waveform generator 106 to compensate an FM waveform for motion of the radar platform can be based upon data output by a sensor 112 mounted on board the radar platform 102. For example, the sensor 112 can output data indicative of a velocity of the radar platform 102 relative to the known reference point.

The waveform generator 106 outputs the modified FM waveform $x._{T''}(t)$, which is compensated for motion of the radar platform 102, to the radar antenna 104. The radar antenna 104 receives an echo return pulse for each of the N pulses of the radar, wherein the echo return pulse comprises a reflection of the transmitted pulse from objects in the target area 110. The antenna 104 outputs the echo returns to the radar data system 108. In exemplary embodiments, the data system 108 can generate radar-based data products such as target indicators, radar-based images etc. In other embodiments, the radar data system 108 generates intermediate data based upon the echo returns, where such intermediate data can be processed at a later time to generate radar data products. In still other embodiments, the radar data system 108 can store the echo returns, for example in a computer memory or data store.

The system 100 therefore facilitates dynamic generation of parametrized FM waveforms that are time-scaled and time-dilated general FM waveforms, wherein the time dilation and time scaling compensates for motion of the radar platform 102. Accordingly, the system 100 is capable of transmitting motion-compensated waveforms in real time for a variety of FM waveforms, including non-linear FM chirps, which can yield a greater signal-to-noise ratio in radar data products derived from their echo returns than linear FM chirps.

It is to be understood that while FIG. 1 illustrates a monostatic radar configuration, the systems and methods described herein are applicable to bistatic radar and multistatic radar systems. Further, it is to be understood that in some configurations operations described herein as being performed with respect to a waveform prior to transmission of a signal from a radar antenna may instead be performed ex post on echo return signals received at the antenna, or on data indicative of such signals as generated, for example, by the radar data system 108. The waveform generator 106 may be implemented at least in part as a field-programmable gate array (FPGA) or an application-specific integrated circuit (ASIC). Still further, it is to be understood that while technologies are described herein as being applicable to radar systems, techniques, methods, and systems described herein are also applicable to other echo-location systems (e.g., sonar).

Figure 2:
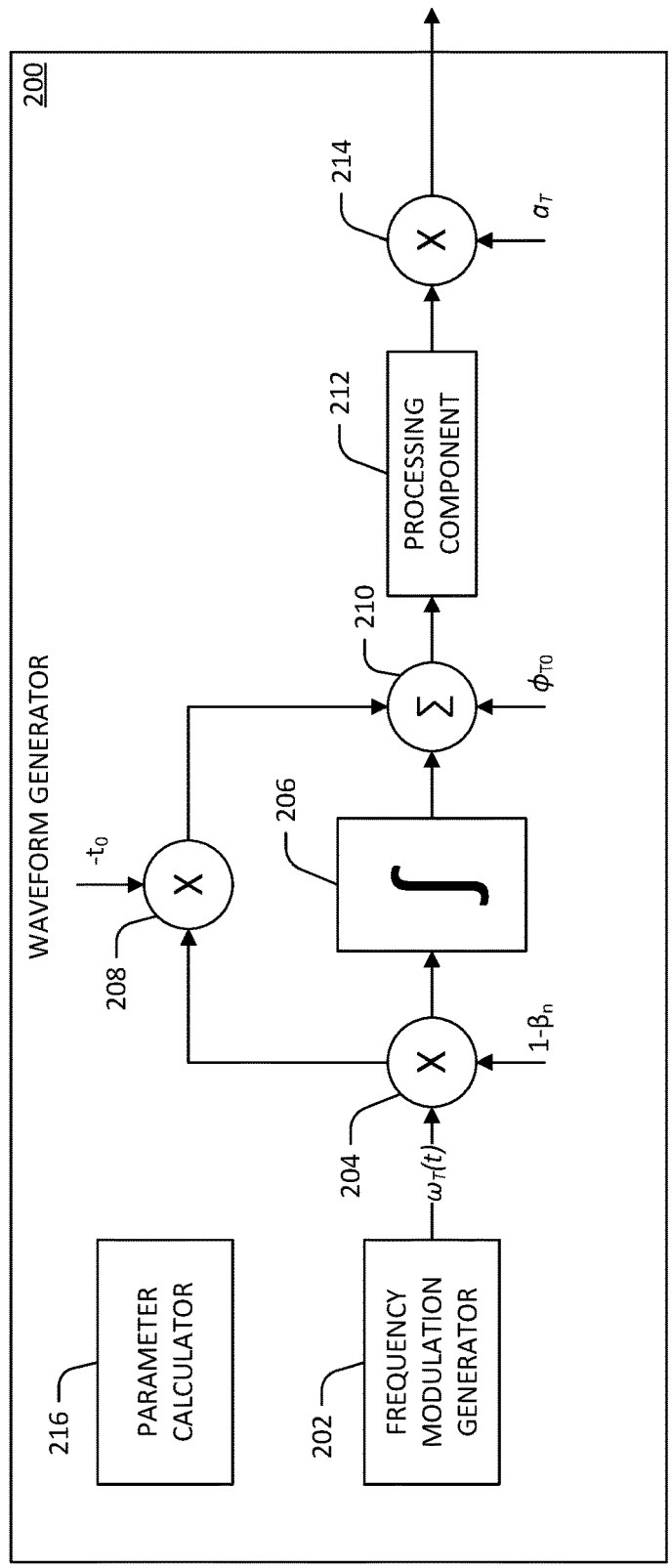
FIG. 2 is a functional block diagram of an exemplary analog waveform generator for generating parametric FM waveforms.

Referring now to FIG. 2, functional block diagram of an exemplary analog waveform generator 200 that facilitates generation of a parametrized FM waveform is illustrated. The waveform generator 200 includes a frequency modulation generator 202 that outputs a general time-varying frequency signal $\omega._{T}(t)$. The waveform generator 200 further includes a first analog multiplier 204 that receives the general frequency signal $\omega._{T}(t)$ from the frequency modulation generator 202. The multiplier 204 outputs a scaled version of the frequency signal $\omega_{\cdot T'}(t)$ to an integrator 206 and a second analog multiplier 208. A summer 210 then receives signals output by the second multiplier 208 and the integrator 206. An output of the summer 210 is received at a processing component 212, where the output of the processing component 212 is a motion-compensated signal $x_{\cdot T''}(t)$ where $\phi_{T'}(t)$ is the input to the processing component 212. The output of the processing component 212 can then be received at a third analog multiplier 214 that scales an amplitude of the motion-compensated signal $x_{\cdot T''}(t)$, whereupon the output of the multiplier 214 comprises the output of the waveform generator 200.

Details of operation of the waveform generator 200 are now described. The frequency modulation generator 202 generates a signal of frequency values of a frequency function $\omega_{\cdot T'}(t)$, where $\omega_{\cdot T'}(t)$ is a time-dependent frequency of an underlying transmit signal for the radar antenna 104, $x_{\cdot T}(t)$. The frequency function $\omega_{\cdot T'}(t)$ can be substantially any function such as, for example, a non-linear FM chirp. The multiplier 204 receives the signal $\omega_{\cdot T'}(t)$ from the frequency modulation generator 202. The multiplier 204 also receives a value of a parameter $1-\beta_{\cdot n'}$, which is a scale value based upon a velocity of the radar platform 102 with respect to a scene reference point (SRP), wherein the scale value is configured to compensate for intra-pulse Doppler effects due to the motion of the radar platform 102. In one example, $\beta_{\cdot n'}$ can be a parameter equal to:

$$\frac{-2v_{c,n}}{c}$$

where $v_{\cdot c,n'}$ is the velocity of the radar platform 102 with respect to the SRP at $t_{\cdot n'}$, a reference time for an nth pulse of the radar antenna 104. Multiplying the waveform $\omega_{\cdot T'}(t)$ by the parameter $1-\beta_{\cdot n'}$ compensates for intra-pulse Doppler effects due to motion of the radar platform 102 during the nth pulse. The multiplier 204 thus scales the frequency $\omega_{\cdot T'}(t)$ such that the output of the waveform generator 200, and ultimately the output of the radar antenna 104, for a given pulse accounts for time-dilation of that pulse due to motion of the radar platform 102. Therefore, when the radar antenna 104 or other receiver antenna receives an echo pulse corresponding to the compensated pulse, the received echo pulse is already adjusted for an intra-pulse Doppler shift caused by the motion of the radar platform 102.

The multiplier 204 outputs the scaled frequency signal $(1-\beta_{\cdot n'})\omega_{\cdot T'}(t)$, which is a first parametrized waveform component, to the integrator 206 and the second multiplier 208. The integrator 206 integrates the scaled frequency signal and outputs a corresponding phase signal $\phi_T(t)$ to the summer 210. Whereas the frequency function $\omega_{\cdot T'}(t)$ is a time-varying frequency of the nominal transmit signal for the radar antenna $x_{\cdot T'}(t)$, the phase signal $\phi_T(t)$ is a time-varying phase of a time-dilated version of the nominal transmit signal $x_{\cdot T'}((1-\beta_{\cdot n'})t)$ The second multiplier 208 receives the scaled frequency signal $(1-\beta_{\cdot n'})\omega_{\cdot T'}(t)$ and a second parameter, $-t_{\cdot 0'}$, wherein $t_{\cdot 0'}$ is based at least in part upon the velocity of the radar platform 102 with respect to the SRP and a difference between an echo delay time of the nth pulse of the radar antenna and a reference echo delay time of a reference pulse of the radar antenna. In an example, the parameter to. can be defined according to the following equation:

$$t_0 = -(1+\beta_n)\tau_{c0,n} + \beta_n t_n$$

In the equation above, $\tau_{\cdot c0,n'}$ is a constant value for the nth pulse that is equal to the difference $t_{\cdot c0,\,n'} - t_{\cdot c0,0'}$, where $t_{\cdot c0,\,n'}$ is the echo delay time between transmission of the pulse n and receipt of an echo of pulse n from the SRP, and $t_{\cdot c0,0'}$ is the echo delay time between transmission of a reference pulse to receipt of an echo of the reference pulse from the SRP. Further, $t_{\cdot n'}$ is a time of transmission of the nth pulse relative to a reference time. Multiplication of the scaled frequency signal $(1-\beta_{\cdot n'})\omega_{\cdot T'}(t)$ as output by the multiplier 204 by the parameter $-t_{\cdot 0'}$ yields a phase offset value that accounts for a time shift of the nth pulse relative to a reference pulse, where the time shift is attributable to motion of the radar platform 102. The multiplier 208 therefore outputs a signal having a value of a phase shift of the nth pulse that corrects for inter-pulse Doppler effects caused by motion of the radar platform 102. This phase shift signal comprises a second parametrized waveform component.

The summer 210 receives the phase signal output by the integrator 206, wherein the phase signal is the integral of the scaled frequency signal output by the multiplier 204 and received by the integrator 206. The summer 210 also receives the signal having the phase offset value output by the multiplier 208, and a signal having a value of a nominal reference phase constant $\phi_{T0}$. The summer 210 outputs a signal comprising a summation of the $\phi_T(t)$ signal output by the integrator, the phase offset signal output by the multiplier 208, and the $\phi_{T0}$ signal. Since the output of the integrator 206 is a phase resulting from integration of the signal $(1-\beta_{\cdot n'})\omega_{\cdot T'}(t)$ as output by the multiplier 204, the summer 210 outputs a signal that comprises the time-dependent phase $\phi_T(t)$ offset by the phase value output by the multiplier 208 and further offset by the reference phase $\phi_{T0}$. The output of the multiplier 210 can be labeled $\phi_{T'}(t)$ and comprises a time-dependent phase function of a function $x_{\cdot T''}(t)$ that is a motion-compensated signal desirably output by the radar antenna 104. The multiplier 210 outputs the signal $\phi_{T'}(t)$ to the processing component 212. The processing component 212 generates a waveform of $x_{\cdot T''}(t)$ based upon the phase function $\phi_{T'}(t)$. In one example, the processing component 212 generates $x_{\cdot T''}(t)$ as a sine function $\sin(\phi_{T'}(t))$. In another example, the processing component 212 can generate a single-sideband equivalent of a complex signal with real and imaginary parts according to $\exp j(\phi_{T'}(t))$. The processing component 212 then outputs the signal $x_{\cdot T''}(t)$ to the third multiplier 214, which scales the amplitude of $x_{\cdot T''}(t)$ by a scaling constant $a_{\cdot T'}$. The resulting waveform $a_{\cdot T} x_{\cdot T''}(t)$ is then output by the waveform generator 200.

The parameters $1-\beta_{\cdot n'}$ and $t_{\cdot 0'}$ can be calculated by a parameter calculator 216. The parameter calculator 216 can then output the parameters $1-\beta_{\cdot n'}$ and $t_{\cdot 0'}$ to the multipliers 204 and 208, respectively. The parameter calculator 216 can be included as part of the waveform generator 200 as shown. In other embodiments, the parameter calculator can be a separate device or a component of another device, and the device can output the parameters $1-\beta_{\cdot n'}$ and $t_{\cdot 0'}$ to the waveform generator 200 whereupon they are received by the multipliers 204 and 208. The parameter calculator 216 can compute the parameters based upon data received from the sensor 112.

The waveform generator 200 operates on a pulse by pulse basis. The parameters $1-\beta_{\cdot n'}$ and $t_{\cdot 0'}$ can be calculated by the parameter calculator 216 for each pulse. Thus, the value of the parameter $\beta_{\cdot n'}$ can vary from one radar pulse to another (e.g., for a first pulse $\beta_{\cdot n'}$ takes the value $\beta_{\cdot 1'}$, for a second pulse $\beta_{\cdot n'}$ takes the value $\beta_{\cdot 2'}$, etc.), or the parameter $\beta_{\cdot n'}$ can maintain a constant value across multiple pulses. The waveform generator 200 then generates a parametrized FM waveform for each pulse based upon the parameters for that pulse. In contrast to conventional approaches, therefore, the waveform generator 200 can output motion-compensated waveforms for transmittal by the radar antenna 104, as calculation of the two parameters $1-\beta._{n'}$ and $t._0$. can be accomplished for each pulse in the limited time available between pulses. For example, in some high-performance radar applications a frequency of pulses can be on the order of kHz, wherein an intra-pulse frequency is on the order of GHz, and the waveform generator 200 can output a different parametrized pulse waveform for each pulse, based upon parameters calculated with respect to each respective pulse.

Figure 3:
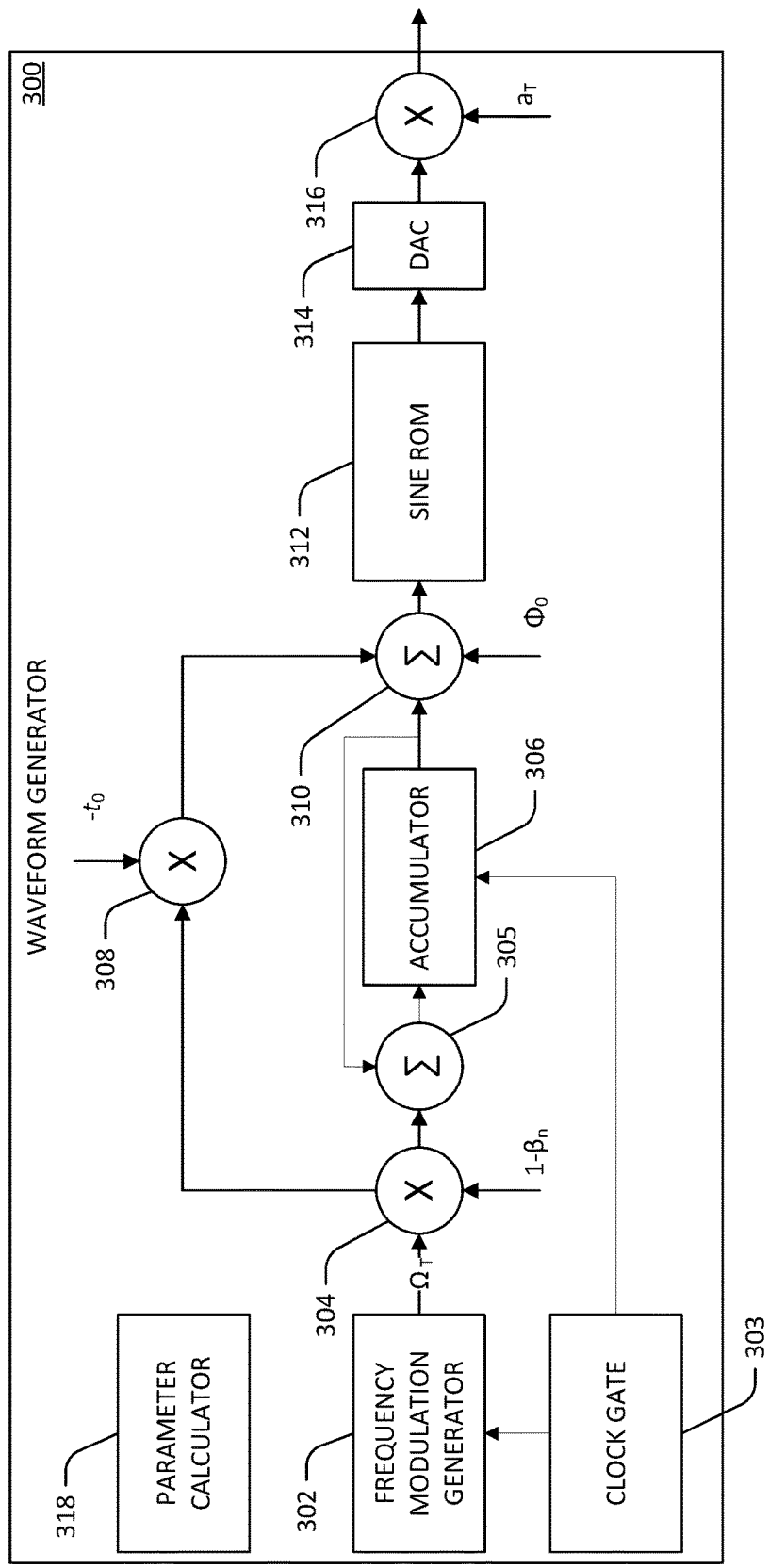
FIG. 3 is a functional block diagram of an exemplary digital waveform generator for generating parametric FM waveforms.

Referring now to FIG. 3, a functional block diagram of an exemplary digital waveform generator 300 that facilitates generation of a parametrized FM waveform is illustrated. The waveform generator 300 includes a frequency modulation generator 302 that outputs an instantaneous discrete-time frequency value $\Omega._T$. for time index T responsive to a clock pulse from a clock gate 303. The waveform generator 300 also includes a digital multiplier 304 that receives the value $\Omega._T$. and multiplies $\Omega._T$. by the parameter $1-\beta._{n'}$. The multiplier 304 outputs a scaled instantaneous frequency value $(1-\beta._{n'})\Omega._T$. that compensates for intra-pulse Doppler effects due to motion of the radar platform 102.

The multiplier 304 outputs the scaled instantaneous frequency $(1-\beta._{n'})\Omega._T$. to a summer 305 that outputs to an accumulator 306. The summer 305 and the accumulator 306 operate similarly to an integrator with respect to the input of discrete-time frequency $\Omega._T$., and the accumulator 306 outputs an instantaneous phase value $\Phi._T$. responsive to each clock pulse from the clock gate 303. The accumulator 306 outputs its current state of $\Phi._T$. to a second summer 310 responsive to receiving the clock pulse from the clock gate 303. The multiplier 304 also outputs the scaled instantaneous frequency to a second multiplier 308. The second multiplier 308 receives the scaled instantaneous frequency and multiplies it by the parameter $-t._0$. to output a phase value of $-t._0.(1-\beta._{n'})\Omega._T$. The phase value output by the second multiplier 308 is an inter-pulse phase value that compensates for inter-pulse Doppler effects due to the motion of the radar platform 102.

The second summer 310 receives the phase value output by the second multiplier 308, an initial reference phase value $\Phi._0$., and the instantaneous phase value $\Phi._T$. The second summer 310 adds these values together to yield the instantaneous phase value $\Phi._{T''}$, which is an instantaneous phase value that is compensated for motion of the radar platform. The second summer 310 outputs the motion-compensated phase value $\Phi._{T''}$ to a sine read-only memory (ROM) 312 that is configured to output a digital value of the sine function with phase $\Phi._{T''}$ as its argument. A digital-to-analog converter (DAC) 314 receives a digital signal comprising a desired output value $x._{T''}$ from the sine ROM 312 and outputs a corresponding analog signal. For each radar pulse, the DAC 314 receives a plurality of values of $x._{T''}$ generated by the waveform generator 300 based upon a respective plurality of values of $\Omega._T$. output by the frequency modulation generator 302. The number of values of $x._{T''}$ generated for each radar pulse is based upon a pulse frequency of the clock gate 303. The pulse frequency of the clock gate 303 is configured based upon a desired frequency range of the radar pulse such that the DAC 314 receives sufficiently many values of $x._{T''}$ at a high enough rate to generate an analog signal having the desired frequency range. The analog output of the DAC 314 can further be scaled by a factor $a._T$. by way of a third multiplier 316 prior to output by the waveform generator 300.

Figure 4:
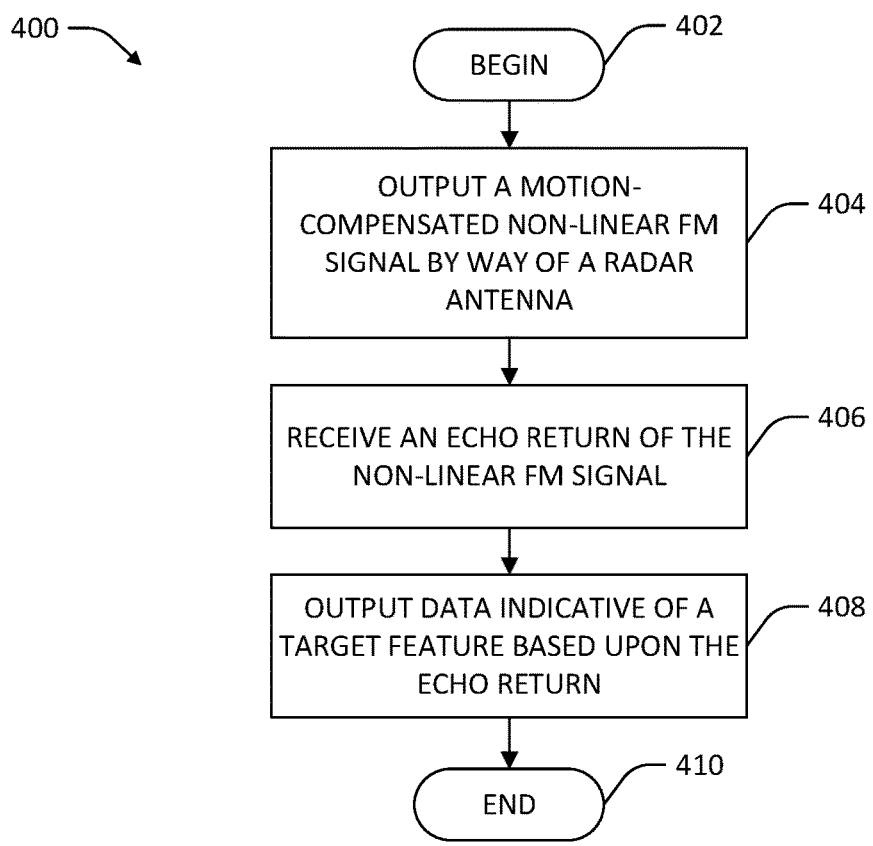
FIG. 4 is a flow diagram that illustrates an exemplary methodology for improving signal-to-noise ratio of radar-based data products.
Figure 5:
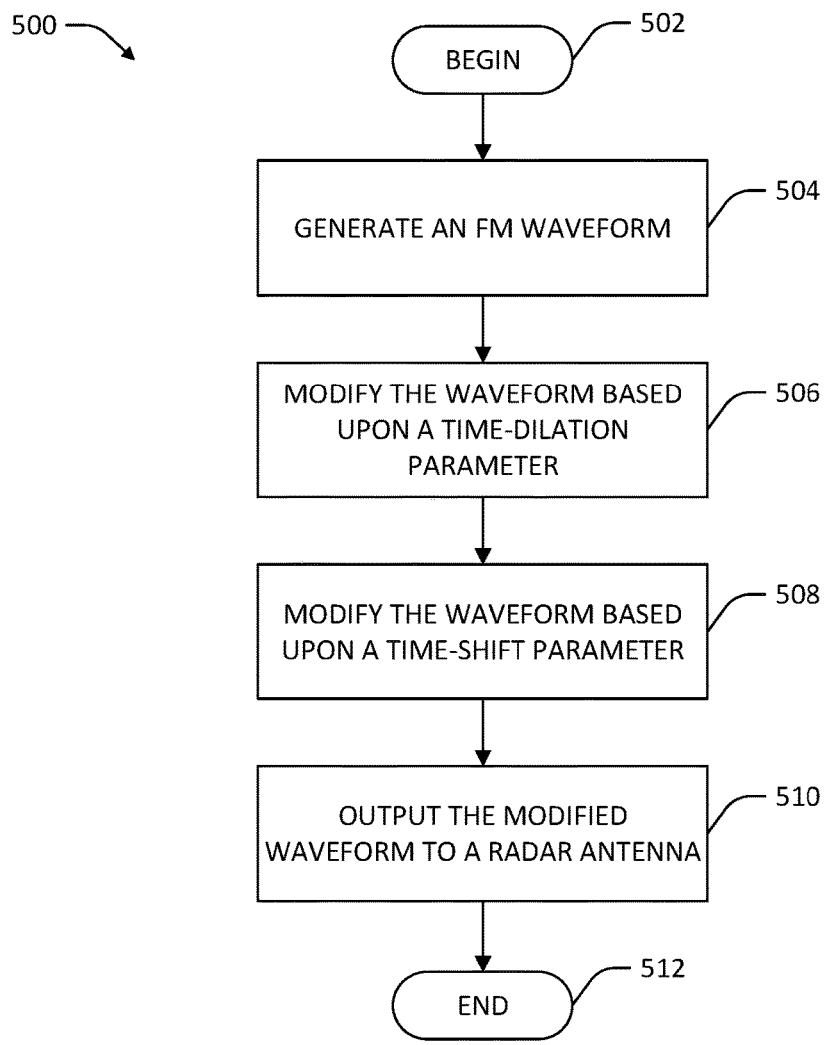
FIG. 5 is a flow diagram that illustrates an exemplary methodology for generating parametrized FM waveforms.

FIGS. 4-5 illustrate exemplary methodologies relating to parametrized FM waveforms for radar systems. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 4, a methodology 400 that facilitates enhancement of signal-to-noise ratio in radar-based data is illustrated. The methodology 400 begins at 402, and at 404 a motion-compensated non-linear FM signal is output to a target area by way of a radar antenna. By way of an example, the motion-compensated non-linear FM signal can be generated by way of a parametric FM waveform generator that modifies a reference FM signal that has a time-variant frequency $\omega(t)$ where $\omega(t)$ is a non-linear function. The parametric FM waveform generator can modify the reference FM signal based upon parameters that are derived from characteristics of motion of the radar platform relative to a target or known SRP. Various data products (e.g., radar-based imagery, radar-based target indication, etc.) generated based upon echo returns of certain non-linear FM signals exhibit greater signal-to-noise ratio than data products based on returns of linear FM chirps. At 406 an echo return of the non-linear FM signal is received from the target area. At 408, data indicative of a feature of a target in the target area is output based on the received echo return. The data can be, for example, a SAR image of the target area that includes the target, wherein the SAR image exhibits a greater signal-to-noise ratio than a SAR image generated based upon an echo return of a linear FM chirp from the target area. At 410 the methodology 400 ends.

Referring now to FIG. 5, a methodology 500 that facilitates output of radar signals compensated for motion of a radar platform is illustrated. The methodology 500 begins at 502 and at 504 an FM waveform is generated. In an example, the FM waveform can be a waveform having a non-linear FM chirp. At 506, the waveform is modified based upon a time-dilation parameter. The time-dilation parameter can be a frequency scaling parameter that is based upon a velocity of the radar platform relative to a target or SRP. The time-dilation parameter can be configured to correct for intra-pulse Doppler effects caused by the motion of the radar platform relative to the target or SRP. In an example, the time-dilation parameter can be the parameter $1-\beta._{n'}$, described above with respect to FIGS. 1-3, and a frequency of a pulse n can be multiplied by $1-\beta._{n'}$. At 508, the waveform is modified based upon a time-shift parameter. The time-shift parameter can be a phase-delay parameter that is configured to correct for inter-pulse Doppler effects caused by motion of the radar platform relative to the target. The time-shift parameter can be a phase delay value that is added to the FM waveform. In one example, the time-shift parameter can be the parameter $-t._0$. described above with respects to FIGS. 1-3. At 510, the modified waveform resulting from the modifications of 506 and 508 is output to a radar antenna, whereupon the methodology 500 ends 512.

Figure 6:
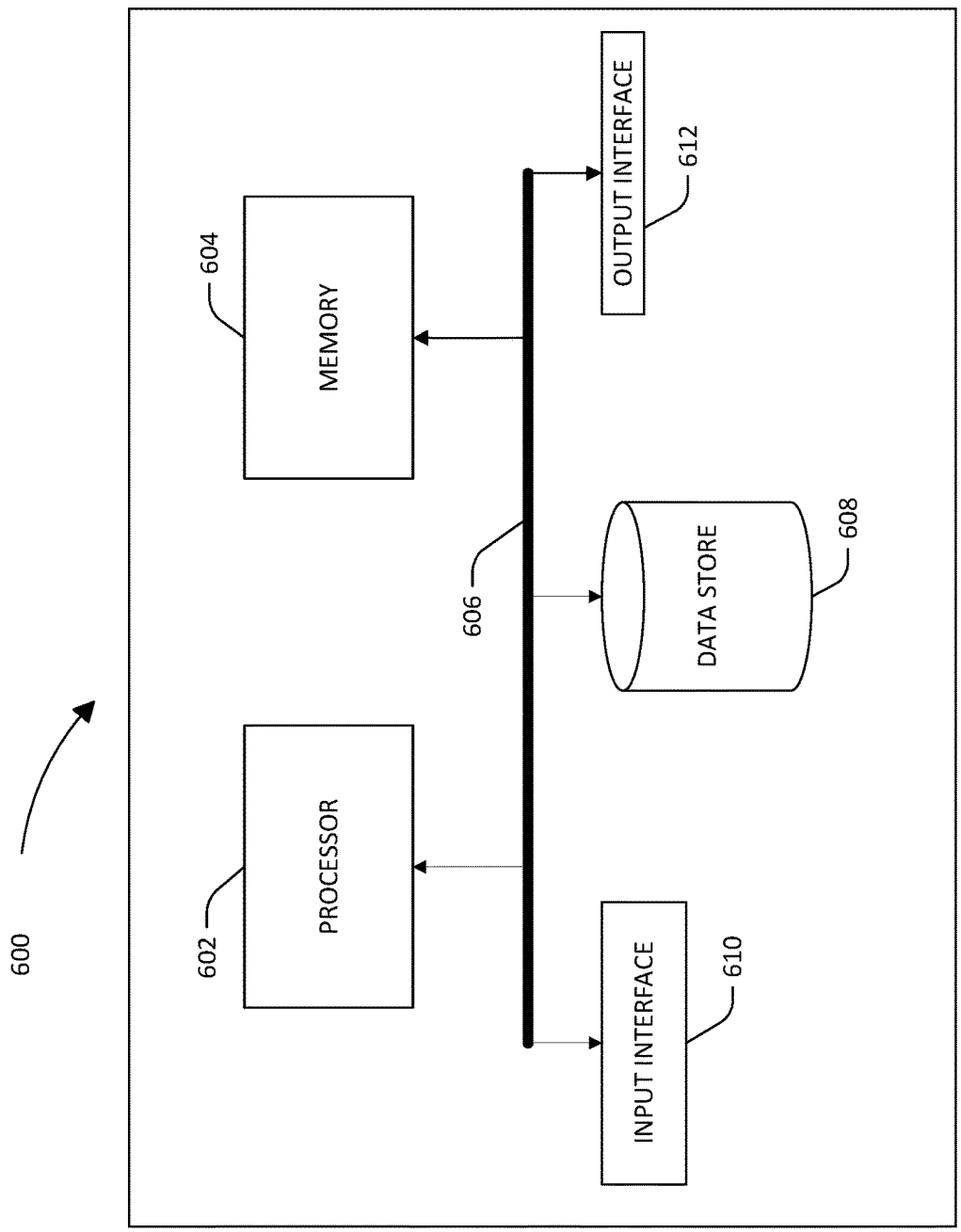
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be used in a system that computes radar waveform compensation parameters. By way of another example, the computing device 600 can be used in a system that processes echo returns of radar signals to generate images and other radar-based data. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store parameter values (e.g., $\beta_n$ and $t_o$), data pertaining to motion of the radar platform 102, radar echo return data, etc.

The computing device 600 additionally includes a data store 608 that is accessible by the processor 602 by way of the system bus 606. The data store 608 may include executable instructions, parameter values, radar data, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable medium includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An intelligence, surveillance, and reconnaissance (ISR) radar system, comprising:
    a radar antenna mounted to an airborne platform that is flying over a scene, wherein the radar antenna outputs a parametrized frequency-modulated (FM) waveform towards the scene; and
    a waveform generator that generates the parametrized FM waveform for output by the radar antenna, wherein the waveform generator generates the parametrized FM waveform by performing the following acts:
        generating an FM waveform; and
        modifying the FM waveform based upon a first parameter, the first parameter based upon a velocity of the radar antenna relative to a reference point in a target area of the scene being flown over by the airborne platform; and
        outputting the modified FM waveform to the radar antenna, wherein the modified FM waveform is the parametrized FM waveform, wherein an image of the scene is generated based upon the modified FM waveform output by the waveform generator.

2. The system of claim 1, the acts further comprising modifying the FM waveform based upon a second parameter, the second parameter based at least in part upon the velocity and a difference between a first echo delay time of a first pulse of the radar antenna and a reference echo delay time of a reference pulse of the radar antenna.

3. The system of claim 2, wherein the waveform generator comprises a field-programmable gate array (FPGA).

4. The system of claim 3, wherein the FPGA comprises:
a first multiplier circuit, the first multiplier circuit configured to output a first parametrized waveform component by multiplying the FM waveform by the first parameter; and
a second multiplier circuit, the second multiplier circuit configured to receive the first parametrized waveform component and to output a second parametrized waveform component by multiplying the first parametrized waveform component by the second parameter; wherein the FPGA is further configured to output the parametrized FM waveform based upon the first parametrized waveform component and the second parametrized waveform component.

5. The system of claim 4, wherein the FPGA further comprises:
an integrator that receives the first parametrized waveform component and outputs a phase of the FM waveform; and
a summing circuit that receives the phase and the second parametrized waveform component and outputs a phase of the parametrized FM waveform; and
wherein further the FPGA is configured to output the parametrized FM waveform based upon the phase of the parametrized FM waveform.

6. The system of claim 2, wherein the second parameter is equal to the expression:

$$-(1+\beta_n)\tau_{c0,n}+\beta_n t_n$$

where $\beta_n$ is a multiple of the velocity of the radar antenna relative to the reference point in the target area, $\tau_{c0,n}$ is the difference between a first echo delay time of an nth pulse of the radar antenna to the reference echo delay time of the reference pulse of the radar antenna, and $t_n$ is a reference time of the nth pulse.

7. The system of claim 2, wherein modifying the FM waveform based upon the first parameter comprises scaling a frequency of the FM waveform by the first parameter, wherein further modifying the FM waveform based upon the second parameter comprises shifting a phase of the FM waveform by a value equal to the second parameter multiplied by the scaled frequency.

8. The system of claim 1, wherein the waveform generator comprises an application-specific integrated circuit (ASIC).

9. The system of claim 1, wherein modifying the FM waveform based upon the first parameter comprises scaling a frequency of the FM waveform by the first parameter.

10. The system of claim 9, wherein the first parameter is approximately equal to the expression:

$$1+\frac{2v_{c,n}}{c}$$

where $v_{c,n}$ is the velocity of the radar antenna relative to the reference point in the target area and c is a velocity of propagation of the parametrized FM waveform output by the radar antenna.

11. The system of claim 1, further comprising a second radar antenna, the second radar antenna configured to receive echo pulses of pulses transmitted by the radar antenna from an object in the target area.

12. The system of claim 11, wherein the radar antenna and the second radar antenna are mounted on a same aircraft.

13. A method, comprising:
generating an FM waveform for output by a radar antenna that is mounted to an airborne platform that is flying over a scene;
modifying the FM waveform based upon a time-shift parameter, the time-shift parameter based upon a velocity of the radar antenna relative to a reference point in a target area in the scene and a change in echo return time of a first pulse of the radar antenna relative to a second pulse; and
outputting the modified waveform to the radar antenna, wherein the modified waveform is a motion-compensated waveform that is compensated for motion of the radar antenna relative to the reference point, and further wherein an image of the scene is generated based upon the modified waveform.

14. The method of claim 13, further comprising modifying the FM waveform based upon a time-dilation parameter, the time-dilation parameter based upon the velocity of the radar antenna relative to the reference point.

15. The method of claim 14, wherein the time-dilation parameter is approximately equal to the expression:

$$1+\frac{2v_{c,n}}{c}$$

where $v_{c,n}$ is the velocity of the radar antenna relative to the reference point in the target area and c is a velocity of propagation of waveforms output by the radar antenna.

16. The method of claim 14, wherein modifying the FM waveform based upon the time-dilation parameter comprises scaling a frequency of the FM waveform based upon the time-dilation parameter.

17. The method of claim 14, wherein modifying the FM waveform based upon the time-dilation parameter comprises scaling a frequency of the FM waveform based upon the time-dilation parameter, wherein further modifying the FM waveform based upon the time-shift parameter comprises shifting a phase of the FM waveform based upon the time-shift parameter and the scaled frequency of the FM waveform.

18. The method of claim 13, wherein the time-shift parameter is approximately equal to the expression:

$$-(1+\beta_n)\tau_{c0,n}+\beta_n t_n$$

where $\beta_n$ is a multiple of the velocity of the radar antenna relative to the reference point in the target area, $\tau_{c0,n}$ is the change in echo return time of the first pulse of the radar antenna relative to the second pulse, and $t_n$ is a reference time of the first pulse.

19. The method of claim 13, wherein modifying the FM waveform based upon the time-shift parameter comprises shifting a phase of the FM waveform based upon the time-shift parameter.

20. A waveform generator that generates motion-compensated signals for output by a radar antenna, the waveform generator comprising:
- a frequency modulation generator that outputs a time-varying frequency signal, wherein the frequency signal is non-linear;
- a first multiplier circuit that outputs a second frequency signal based upon multiplying the frequency signal by a first parameter, the first parameter based upon a velocity of the radar antenna relative to a reference point in a target area of the antenna;
- an integrator that receives the second frequency signal and outputs a first phase signal based upon the second frequency signal;
- a second multiplier circuit that receives the second frequency signal and outputs a phase offset based upon multiplying the second frequency signal by a second parameter, the second parameter based upon a velocity of the radar antenna relative to the reference point and a change in echo return time of a first pulse of the radar antenna relative to a second pulse;
- a summing circuit that receives the first phase signal and the phase offset and outputs a second phase signal, the second phase signal comprising a sum of the first phase signal and the phase offset; and
- a processing component that outputs a motion-compensated FM waveform based upon the second phase signal.

* * * * *